(12) United States Patent
Tamura

(10) Patent No.: US 8,672,422 B2
(45) Date of Patent: Mar. 18, 2014

(54) HYDRAULIC BRAKE APPARATUS OF MOTORCYCLE

(75) Inventor: Hiroshi Tamura, Akashi (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 13/190,740

(22) Filed: Jul. 26, 2011

(65) Prior Publication Data
US 2012/0032500 A1 Feb. 9, 2012

(30) Foreign Application Priority Data
Aug. 4, 2010 (JP) ................ P2010-175133

(51) Int. Cl.
*B60T 8/32* (2006.01)
*B62K 25/08* (2006.01)

(52) U.S. Cl.
USPC .......................................... 303/137; 180/219

(58) Field of Classification Search
USPC .................. 180/218, 219, 227; 303/9.64, 137
See application file for complete search history.

(56) References Cited

U.S. PATENT DOCUMENTS

| | | | | |
|---|---|---|---|---|
| 4,697,825 | A * | 10/1987 | Hayashi et al. | 280/276 |
| 5,419,625 | A * | 5/1995 | Iwase et al. | 303/116.1 |
| 6,349,785 | B1 | 2/2002 | Ohmika et al. | |
| 7,708,098 | B2 * | 5/2010 | Toyoda | 180/219 |
| 7,963,359 | B2 * | 6/2011 | Fujita | 180/227 |
| 2005/0134114 | A1 * | 6/2005 | Asahi | 303/137 |
| 2007/0145227 | A1 | 6/2007 | Hasegawa | |
| 2009/0243378 | A1 * | 10/2009 | Ito et al. | 303/28 |

FOREIGN PATENT DOCUMENTS

| | | |
|---|---|---|
| EP | 0 624 498 A2 | 11/1994 |
| EP | 1 826 086 A1 | 8/2007 |
| EP | 2 404 796 A1 | 1/2012 |
| JP | 6-329006 | 11/1994 |
| JP | 7-88158 | 9/1995 |
| JP | 11-314590 | 11/1999 |
| JP | 2001-39374 | 2/2001 |
| JP | 2007-076555 | 3/2007 |
| JP | 2007-176466 | 7/2007 |
| JP | 2008-074206 | 4/2008 |
| JP | 2010-058699 | 3/2010 |

OTHER PUBLICATIONS

Extended European Search Report issued Sep. 11, 2013 in corresponding European Application No. 11176409.8.

* cited by examiner

*Primary Examiner* — Christopher Schwartz
(74) *Attorney, Agent, or Firm* — Wenderoth, Lind & Ponack, LLP

(57) ABSTRACT

An hydraulic brake apparatus of a motorcycle, including a main frame having a pair of right and left frame members extending rearward from a head pipe, and equipment arranged in a space between the right and left frame members. The hydraulic brake apparatus further includes at least one brake fluid pipe, wherein the at least one brake fluid pipe is arranged so as to extend rearward from near the head pipe along an upper surface at least one of the frame members.

8 Claims, 10 Drawing Sheets

HYDRAULIC BRAKE APPARATUS OF MOTORCYCLE

FIELD OF THE INVENTION

The present invention relates to a hydraulic brake apparatus of a motorcycle, which includes a main frame having a pair of right and left frame members extending rearward from a head pipe, and equipment arranged in a space between the right and left frame members.

DESCRIPTION OF THE RELATED ART

In a brake piping configuration of the hydraulic brake apparatus, typically, a brake lever on a steering handlebar and a brake pedal provided near a step are connected to braking portions such as disc brakes arranged on front and rear wheels via various brake fluid pipes (Japanese Patent Application Publication (JP-B) No. 7-88158). For the characteristic of a motorcycle required to have compactness, the brake fluid pipes are required to be disposed so as to be hard to see from the outside as much as possible and so as not to obstruct the arrangement of various equipment.

In addition, as a configuration of a main frame of a motorcycle, right and left frame members extend rearward from a head pipe. In the main frame configuration having the right and left frame members, an air cleaner box, a fuel tank, or the like is arranged as the equipment between the right and left frame members.

In the motorcycle having the right and left frame members as the main frame, brake fluid pipes are arranged on the inner side surfaces of the frame members, that is, on the surfaces on the center side in the vehicle width direction. However, when the brake fluid pipes are arranged on the inner side surfaces of the frame members, the space between the right and left frame members becomes smaller to limit the size of the equipment arranged between the frame members.

For example, when the air cleaner box is arranged between the frame members, its volume is limited to affect air intake performance or air intake noise. In addition, when the fuel tank is arranged, the limit of the volume of the tank is considered. Further, when the equipment such as the air cleaner box is detached, the brake fluid pipes interfere with the equipment, with the result that the detaching operability is low.

The present invention has been made in view of the above problems and provides a hydraulic brake apparatus of a motorcycle, which can secure the size of various equipment arranged between frame members to compactly dispose brake fluid pipes along the frame members and make the detaching operation of the equipment easy.

SUMMARY OF THE INVENTION

To address the above problems, the present invention provides a hydraulic brake apparatus of a motorcycle, including a main frame having a pair of right and left frame members extending rearward from a head pipe, and equipment arranged in a space between the right and left frame members, the hydraulic brake apparatus comprising a brake fluid pipe extending rearward from near the head pipe, wherein the brake fluid pipe is arranged so as to extend rearward along an upper surface of the frame member.

According to the present invention, the following configurations of the hydraulic brake apparatus of a motorcycle can also be adopted.

(a) The brake fluid pipe extending rearward from near the head pipe includes a brake lever brake fluid pipe connected to a master cylinder of a brake lever on a steering handlebar, and a caliper brake fluid pipe connected to a caliper of a hydraulic braking portion provided on a front wheel. In this case, the brake lever brake fluid pipe and the caliper brake fluid pipe can be distributively arranged on the right and left frame members, and can also be integrally arranged on one of the right and left frame members.

(b) In the brake fluid pipe arranged on the upper surface of the frame member, one end portion in the fore-aft direction is formed of a member having flexibility, and other end portion is formed of a member having higher rigidity than the one end portion.

(c) The upper portion of the frame member is provided with a clamp member fixing the brake fluid pipe.

(d) In addition, the hydraulic brake apparatus comprises a hydraulic control unit such as an ABS unit displaced to one of the right and left sides relating to a center of the motorcycle, and the front wheel caliper brake fluid pipe is arranged on the same side frame member as the hydraulic control unit.

(1) According to the present invention, the brake fluid pipe is arranged along the upper surface of the frame member, so that it can be arranged compactly, and can largely secure the space between the right and left frame members, whereby the shape of the equipment arranged between the right and left frame members can be large, and the detaching of the equipment can be easy. In addition, the maintenance of the brake fluid pipe itself can be easy.

(2) With the configuration (a), the brake lever brake fluid pipe and the caliper brake fluid pipe for braking the front wheel are provided on the upper surfaces of the frame members, so that the piping length of the brake fluid pipes can be shortened, and a layout placement of the brake fluid pipes can be simplified. When both the brake fluid pipes are distributively arranged on the right and left frame members, the small spaces above the right and left frame members can be used effectively, respectively. On the other hand, when both the brake fluid pipes are arranged together on one of the right and left frame members, the number of components such as clamp members for attaching can be reduced, and the attaching operation of the brake fluid pipe can be easy.

(3) With the configuration (b), in the brake fluid pipe, one end portion in the froe-aft direction is formed of a member having flexibility, and a remaining portion is formed of a member having higher rigidity than the one end portion. Accordingly, when the equipment is detached, the one end portion having flexibility is used to extend the brake fluid pipe outward in the right and left direction, so that the detaching of the equipment can be easy.

(4) With the configuration (c), a clamp fixing the brake fluid pipe is provided in the upper portion of the frame member, so that the equipment arranging space between the right and left frame members can be secured more largely.

(5) With the configuration (d), the hydraulic control unit and the front wheel caliper brake fluid pipe are arranged so as to be displaced to the same side of the right and left sides, so that the distance between the hydraulic control unit and the front wheel caliper can be shortened to shorten a piping path.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE INVENTION

First Embodiment (The Overview of Piping for Hydraulic Brake Apparatus)

Figure 1:
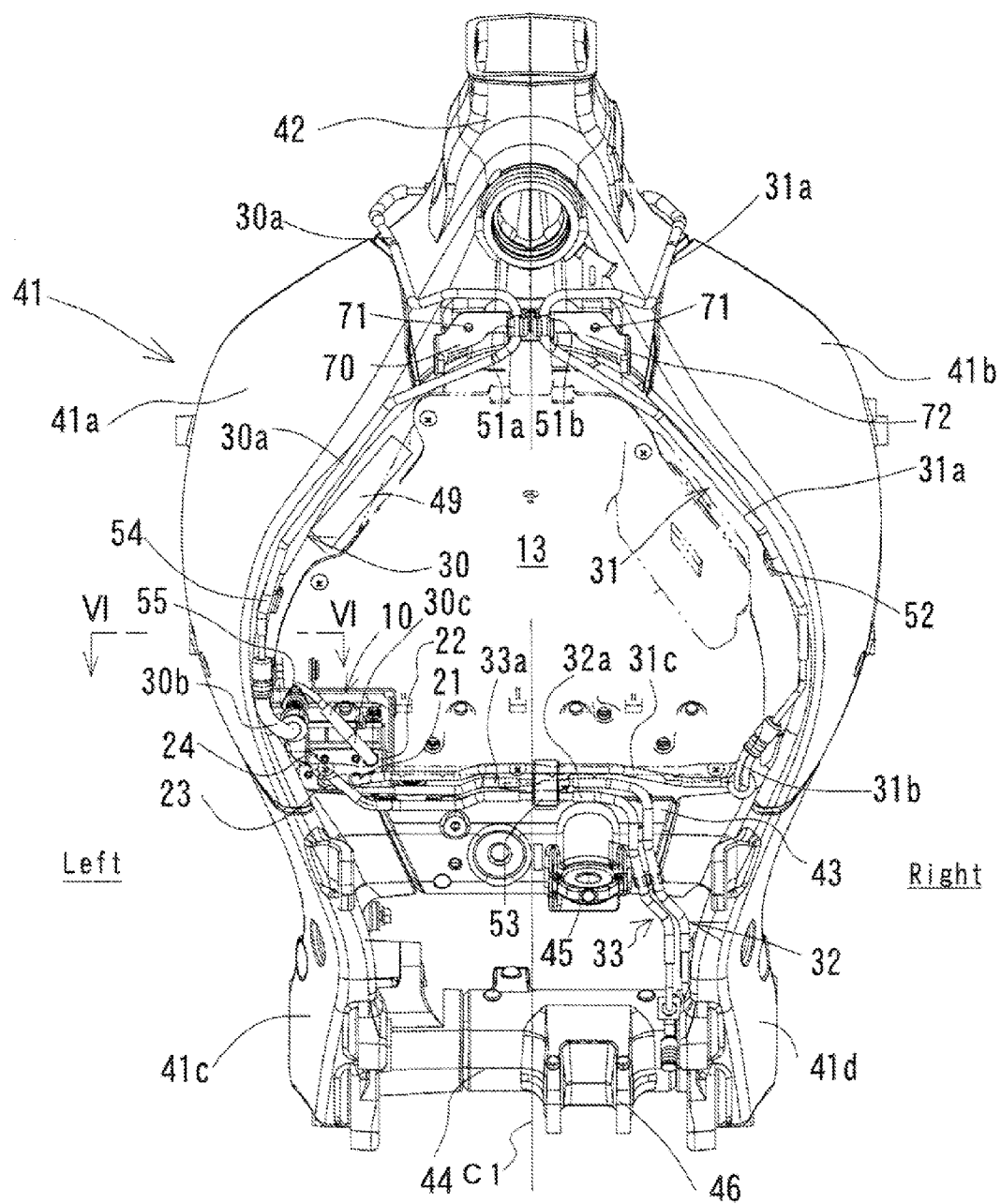
FIG. 1 is a plan view of a main frame of a motorcycle according to a first embodiment of the present invention.
Figure 2:
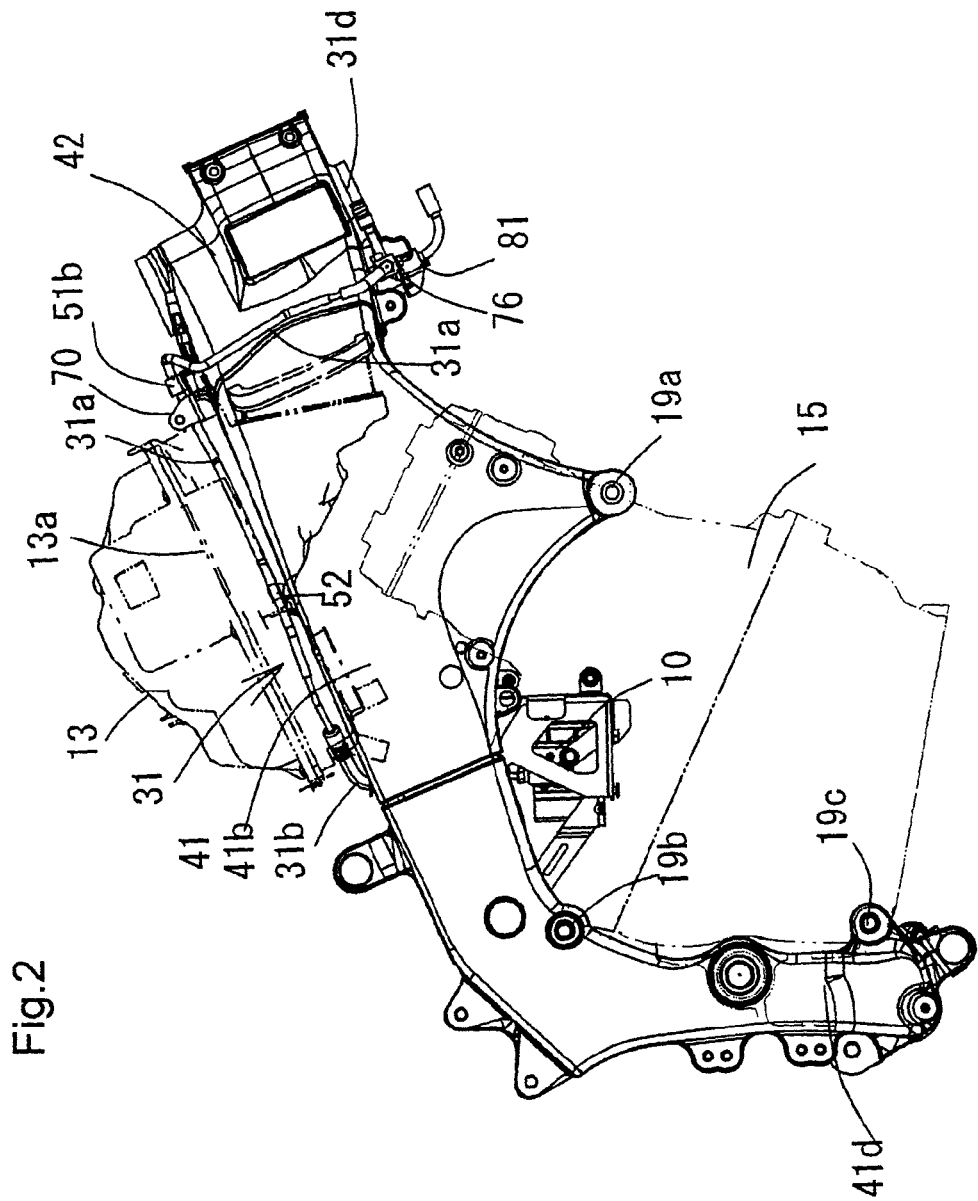
FIG. 2 is a right side view of FIG. 1.
Figure 3:
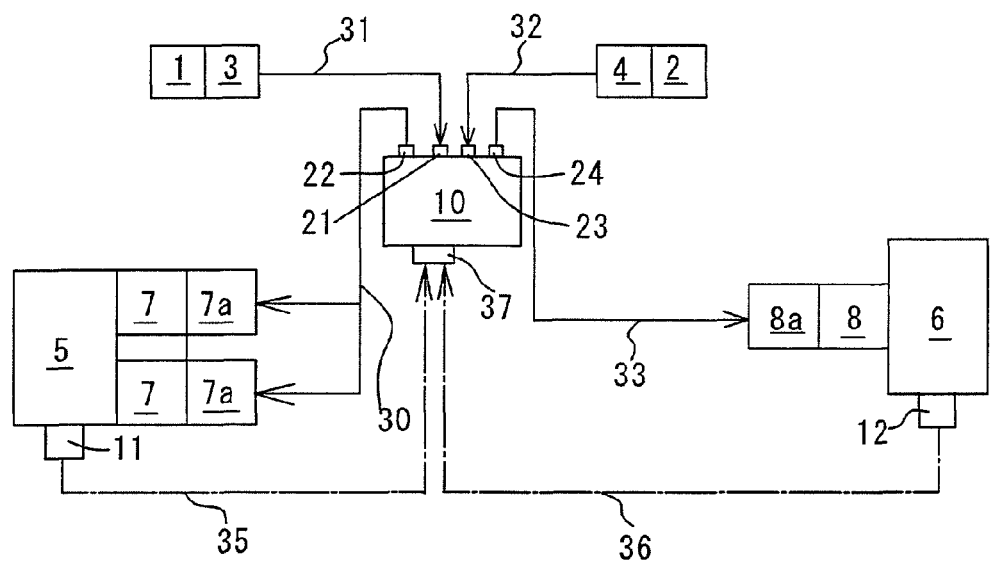
FIG. 3 is a brake piping diagram.

FIGS. 1 to 10 show a motorcycle including a hydraulic brake apparatus according to a first embodiment of the present invention. First, the overview of the hydraulic brake apparatus will be described with reference to a brake piping diagram shown in FIG. 3. In FIG. 3, the hydraulic brake apparatus includes, as a brake operating portion, a front wheel brake lever 1 provided on a steering handlebar, and a rear wheel brake pedal 2 provided near a right step. The brake lever 1 and the brake pedal 2 are connected to master cylinders 3 and 4, respectively. The hydraulic brake apparatus includes, as a wheel braking portion, a pair of right and left front wheel disc braking devices 7 provided on a front wheel 5, and a rear wheel disc braking device 8 provided on a rear wheel 6. The disc braking devices 7 and 8 are provided with calipers 7a and 8a for sandwichably pressing the brake discs, respectively. In this embodiment, a hydraulic unit which increases or generates a brake hydraulic pressure and controls an operation with a brake fluid includes an ABS unit 10 for antilock controlling (antilock brake system unit), and rotation speed sensors 11 and 12 which detect the rotation speeds of the front wheel 5 and the rear wheel 6, respectively.

The master cylinder 3 of the brake lever 1 is connected to a front wheel input port 21 of the ABS unit 10 via a brake lever brake fluid pipe assembly 31. The master cylinder 4 of the brake pedal 2 is connected to a rear wheel input port 23 of the ABS unit 10 via a brake pedal brake fluid pipe assembly 32.

A front wheel output port 22 of the ABS unit 10 is connected to the right and left calipers 7a, 7a for braking the front wheel via a front wheel caliper brake fluid pipe assembly 30. A rear wheel output port 24 of the ABS unit 10 is connected to the caliper 8a for braking the rear wheel via a rear wheel caliper brake fluid pipe assembly 33.

The rotation speed sensors 11 and 12 are connected to an electric signal connection terminal portion 37 of the ABS unit 10 via lead wires 35 and 36, respectively.

(Configurations of Main Frame and the Like)

FIG. 1 is a plan view of a main frame 41 and an air cleaner box 13 of the motorcycle. The main frame 41 has a pair of a left frame member 41a and a right frame member 41b extending rearward from a head pipe (head box) 42, like an inverted V-shape so as to extend from each other in the vehicle width direction. The rear portions of the frame members 41a and 41b have a reduced interval in the right and left direction again, and are integrally coupled by an upper cross member 43. The rear ends of the frame members 41a and 41b are integrally formed with swing arm bracket portions 41c and 41d further extending downward. The lower ends of the swing arm bracket portions 41c and 41d are coupled by a lower cross member 44. An air intake passage through which air for burning passes is formed in the head pipe 42.

The upper cross member 43 is integrally formed with a bracket attaching portion 45 which rotatably supports the front end (upper end) of a rear shock absorber (not shown). The lower cross member 44 is integrally formed with a boss portion 46 which supports a link mechanism (not shown) coupled to the rear end (lower end) of the rear shock absorber. The bracket attaching portion 45 and the boss portion 46 are formed in the position displaced right side from a vehicle width centerline C1.

The air cleaner box 13 of the air intake device of an engine 15 is arranged in the space formed between the left frame member 41a and the right frame member 41b. The air inlet at the front end of the air cleaner box 13 is connected to the head pipe 42, and is communicated with the air intake passage in the head pipe 42. The rear end of the air cleaner box 13 extends to near the front end of the upper cross member 43. In addition, in plan view, the right and left edges of the air cleaner box 13 have a shape substantially along the inner side surfaces of the left frame member 41a and the right frame member 41b. The left side surface in the front portion of the air cleaner box 13 is formed with a recess portion for housing a relay box 49.

In plan view, the ABS unit 10 for the hydraulic brake apparatus is arranged in the region surrounded by the outermost hull surfaces of the frame members 41a and 41b and the upper cross member 43, and is located near the left frame member 41a and near the front side of the upper cross member 43.

The input ports 21 and 23 and the output ports 22 and 24 are provided to the upper surface of the ABS unit 10. The front wheel operation side input port 21 and the front wheel operation side output port 22 are located in the right half portion of the upper surface of the ABS unit 10. The rear wheel operation side input port 23 and the rear wheel operation side output port 24 are located in the left half portion of the upper surface of the ABS unit 10. In addition, the input ports 21 and 23 are located at the rear end of the upper surface of the ABS unit 10, and the output ports 22 and 24 are located at the front end of the upper surface of the ABS unit 10.

The ABS unit 10 unitably includes a hydraulic pump for pressurizing the brake fluid discharged from the output ports 22 and 24, various valves for opening and closing the ports, an ECU (not shown) for brake control, and the electric signal connection terminal portion.

FIG. 2 is a right side view of the main frame 41 of FIG. 1. The engine 15 is arranged on the lower side of the main frame 41. The engine 15 is, e.g., a parallel four-cylinder engine, and is attached to engine attaching portions 19a, 19b, and 19c provided to the main frame 41 with bolts or the like.

In the air cleaner box 13, the upper and lower half-split members are coupled with a joint 13a and the upper half portion is arranged so as to be projected upward from the upper ends of the frame members 41a and 41b. The intake air outlet in the rear portion of the air cleaner box 13 is connected to the air intake device such as the throttle body of the engine 15 via an air intake pipe or the like (not shown). A fuel tank (not shown) is arranged on the upper side in the rear half portion of the air cleaner box 13. The fuel tank extends to near the rear end of the main frame 41.

(Specific Piping of the Brake Apparatus)

In FIG. 1, the brake lever brake fluid pipe assembly 31 connected to the front wheel operation side input port 21 crosses rightward in the main frame 41 along the upper cross member 43, and extends forward along the upper surface of the right frame member 41b to the head pipe 42. The brake lever brake fluid pipe assembly 31 includes a first brake fluid pipe 31a made of metal and disposed along the upper surface of the right frame member 41b, a second brake fluid pipe 31b made of rubber having flexibility, connected to the rear end of the first brake fluid pipe 31a, and curved downward along the inner side surface of the right frame member 41b to near the right end of the upper cross member 43 near the rear end or in the region rearward of the air cleaner box 13, and a third brake fluid pipe 31c made of metal, connected to the lower end of the second brake fluid pipe 31b, extending leftward along the upper cross member 43, and connected to the front wheel operation side input port 21. Resin protective tubes (protectors) are fitted to the outer circumference surfaces of the first brake fluid pipe 31a and the third brake fluid pipe 31c, which are made of metal.

The brake lever brake fluid pipe assembly 31 is fixed to the main frame 41 by a right front clamp 51b provided to the head pipe 42, a right middle clamp 52 provided in the upper portion of the right frame member 41b, and a center rear clamp 53 provided in the upper portion of the upper cross member 43. That is, the front end of the first brake fluid pipe 31a is fixed to the upper surface of the head pipe 42 by the right front clamp 51b, the middle portion of the first brake fluid pipe 31a is fixed to the upper surface of the right frame member 41b by the right middle clamp 52, and the third brake fluid pipe 31c is fixed to the upper cross member 43 by the center rear clamp 53.

The front wheel caliper brake fluid pipe assembly 30 on the left side includes a first brake fluid pipe 30a made of metal and disposed along the upper surface of the left frame member 41a, a second brake fluid pipe 30b made of rubber, connected to the rear end of the first brake fluid pipe 30a, and curved downward to near the upper surface of the ABS unit 10, and a third brake fluid pipe 30c made of metal, connected to the lower end of the second brake fluid pipe 30b, extending rightward and rearward, and connected to the front wheel operation side output port 22 of the ABS unit 10. Resin protective tubes are fitted to the outer circumference surfaces of the first brake fluid pipe 30a and the third brake fluid pipe 30c, which are made of metal.

The front wheel caliper brake fluid pipe assembly 30 is fixed to the main frame 41 by a left front clamp 51a provided to the head pipe 42, a left middle clamp 54 provided in the upper portion of the left frame member 41a, and a left rear clamp 55 provided in the upper portion of the left frame member 41a rearward of the left middle clamp 54. That is, the front end of the first brake fluid pipe 30a is fixed to the upper surface of the head pipe 42 by the left front clamp 51a, the rear end of the first brake fluid pipe 30a is fixed to the upper portion of the left frame member 41a by the left middle clamp 54, and the second brake fluid pipe 30b made of rubber is fixed to the upper portion on the inner side surface of the left frame member 41a by the left rear clamp 55.

The first brake fluid pipe 30a on the left side and the first brake fluid pipe 31a on the right side are arranged on the upper surfaces of the left frame member 41a and the right frame member 41b, respectively, so that they are substantially located outward in the right and left directions from the right and left side walls of the upward projected portion of the air cleaner box 13.

Further, the brake pedal brake fluid pipe assembly 32 connected to the rear wheel operation side input port 23 and the rear wheel caliper brake fluid pipe assembly 33 connected to the rear wheel operation side output port 24 extend rightward in the main frame 41 along the upper cross member 43, and extend rearward and downward from the midway.

Figure 4:
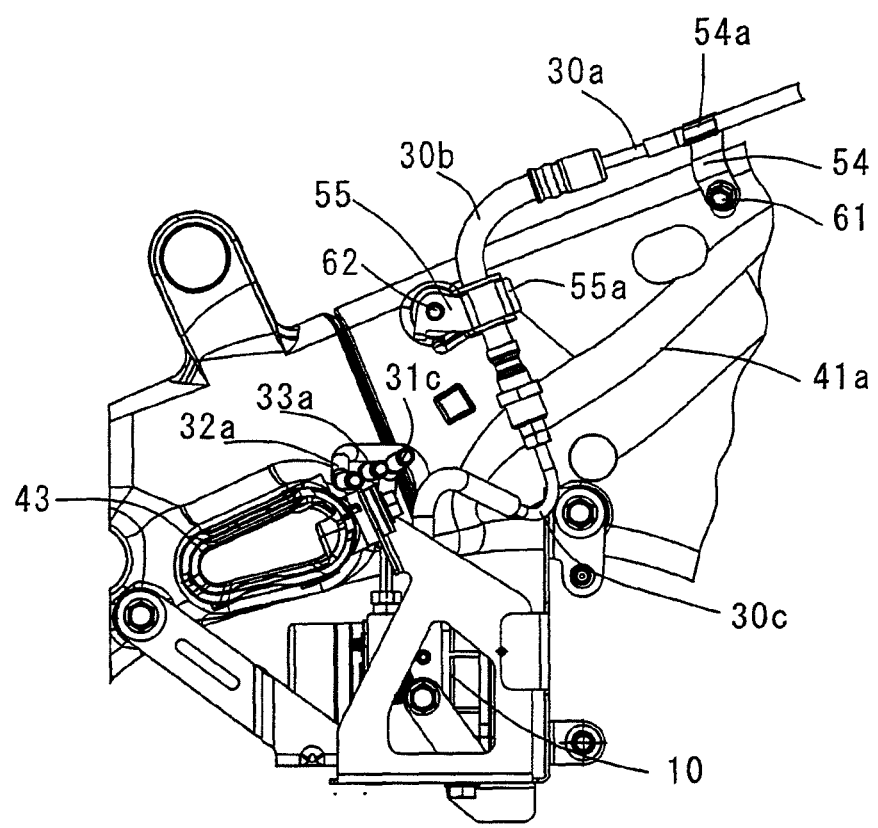
FIG. 4 is an inner side view (right side view) of a left frame member of the main frame of FIG. 1.

FIG. 4 is an enlarged view of the inner side surface (right side surface) of the left frame member 41a, and shows the details of the left middle clamp 54 and the left rear clamp 55 of the front wheel caliper brake fluid pipe assembly 30. In FIG. 4, the left middle clamp 54 is made of sheet metal or resin, has a lower end fixed to the upper end of the inner side surface (right side surface) of the left frame member 41a with a bolt 61 so as to be projected upward from the upper end of the left frame member 41a, and has an upper portion integrally formed with a C-shaped holding portion 54a. The C-shaped holding portion 54a is opened substantially rightward, and holds the rear end of the first brake fluid pipe 30a for the front wheel caliper by pushing the rear end of the first brake fluid pipe 30a into the opening portion thereof.

The left rear clamp 55 is made of sheet metal or resin, is fixed to the upper end of the inner side surface (right side surface) of the left frame member 41a with a bolt 62, and has an end integrally formed with a C-shaped holding portion 55a. The rear portion of the second brake fluid pipe 30b for the front wheel caliper, which is made of rubber, is held by the C-shaped holding portion 55a of the clamp 55 via a rubber damper or a protective tube.

Figure 5:
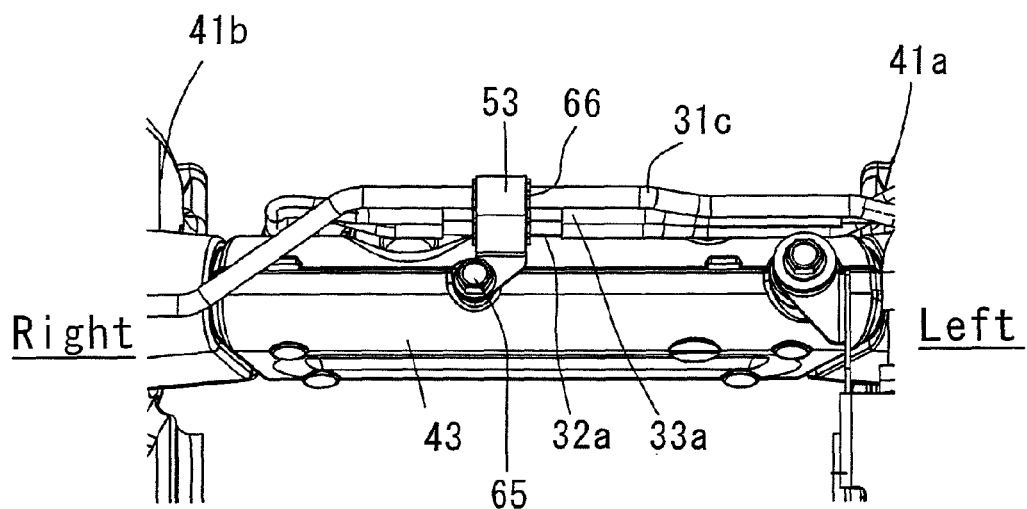
FIG. 5 is a front view of an upper cross portion of the main frame of FIG. 1.

FIG. 5 is a front view of the upper cross member 43. The center rear clamp 53 is fixed to the front surface of the upper cross member 43 with a bolt 65, and is erected upward. The third brake fluid pipe 31c for the brake lever is held together with the brake pedal brake fluid pipe 33a and the rear wheel caliper brake fluid pipe 32a via a piping holder 66 made of resin or rubber above the upper cross member 43.

Figure 6:
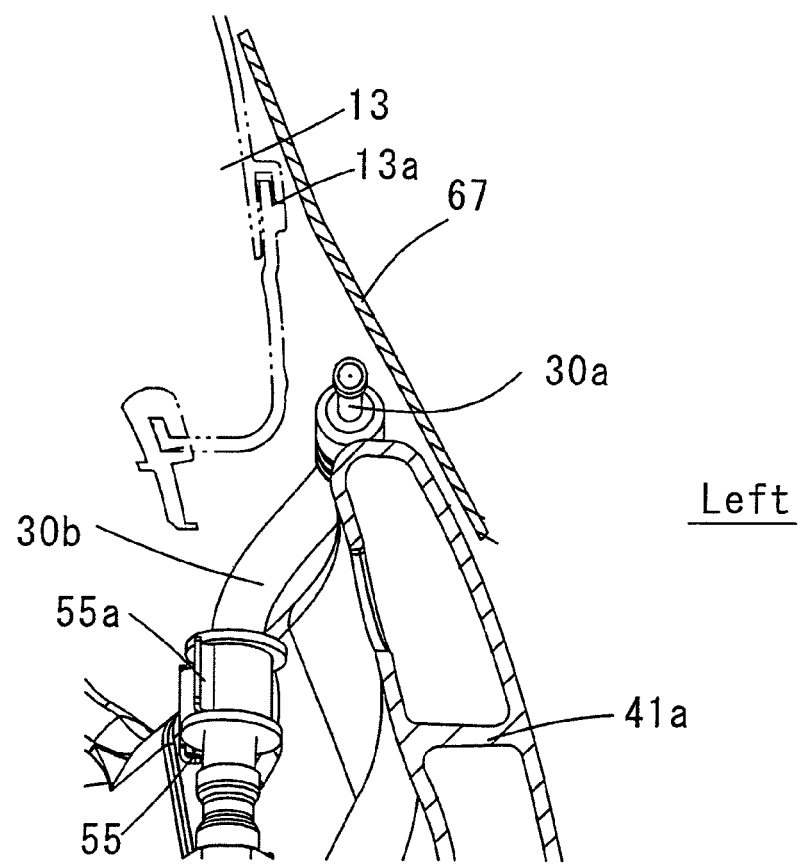
FIG. 6 is an enlarged sectional view taken along line VI-VI of FIG. 1.

FIG. 6 is an enlarged sectional view taken along line VI-VI of FIG. 1. The left side (outward side of the vehicle body) of the first brake fluid pipe 30a for the front wheel caliper, which passes through the clearance between the upper surface of the left frame member 41a and the air cleaner box 13, is covered with a decorative cover 67 which covers the side wall of the upper portion of the air cleaner box 13 and the side wall of the fuel tank, thereby being hidden from the outside. Likewise, the first brake fluid pipe 31a for the brake lever arranged on the upper surface of the right frame member 41b of FIGS. 1 and 2 is covered with the right decorative cover 67.

Figure 7:
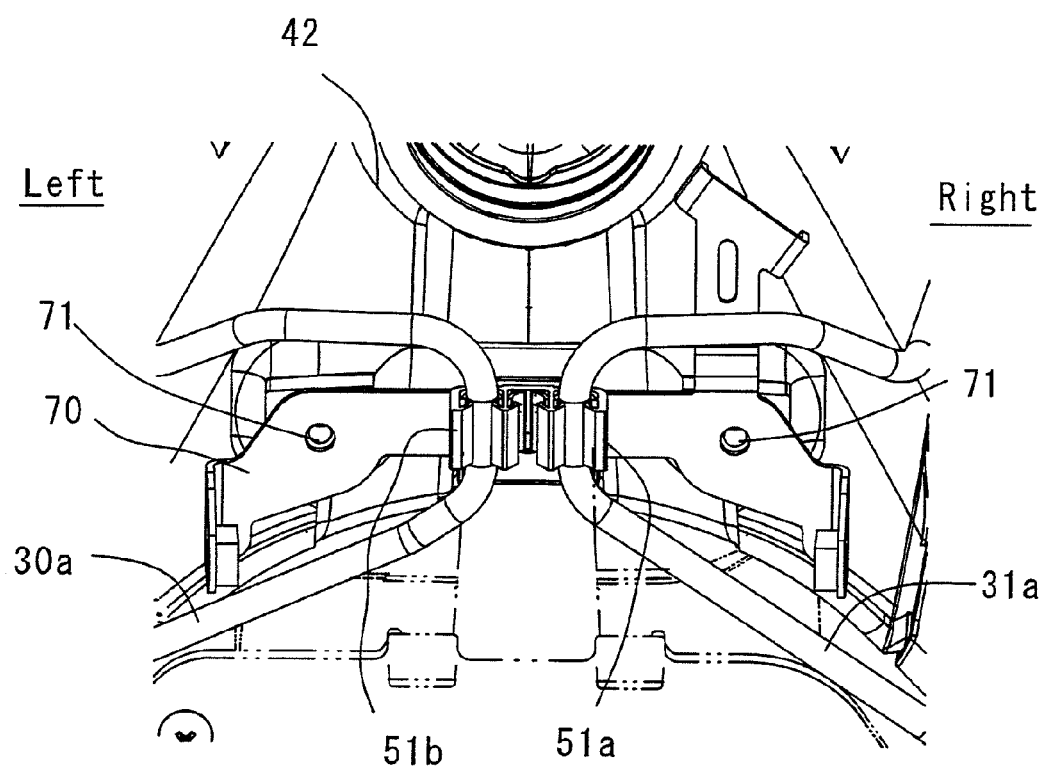
FIG. 7 is an enlarged plan view of a head pipe of the main frame of FIG. 1.

FIG. 7 is an enlarged plan view of the head pipe 42, and shows the details of the front clamps 51a and 51b. An attaching bracket 70 for attaching the front ends of the right and left fuel tank covers 67 (FIG. 6) is attached to the upper surface of the head pipe 42. The right front clamp 51a and the left front clamp 51b are integrally molded with resin. This integrated molded article is integrally fixed to the upper surface of the center portion of the width in the right and left direction of the attaching bracket 70 by insertion or the like. Alternatively, the front clamps 51a and 51b are integrally molded to the attaching bracket 70 by resin. The right and left front clamps 51a and 51b are formed in a U-shape opened upward, are formed at the upper ends with arrowhead-shaped return portions, and hold the first brake fluid pipe 30a for the front wheel caliper and the first brake fluid pipe 31a for the brake lever by pushing them thereinto from above. Further, the lower surface of the attaching bracket 70 is provided with an attaching portion (female screw hole) for fixing the front end of the air cleaner box 13.

Figure 8:
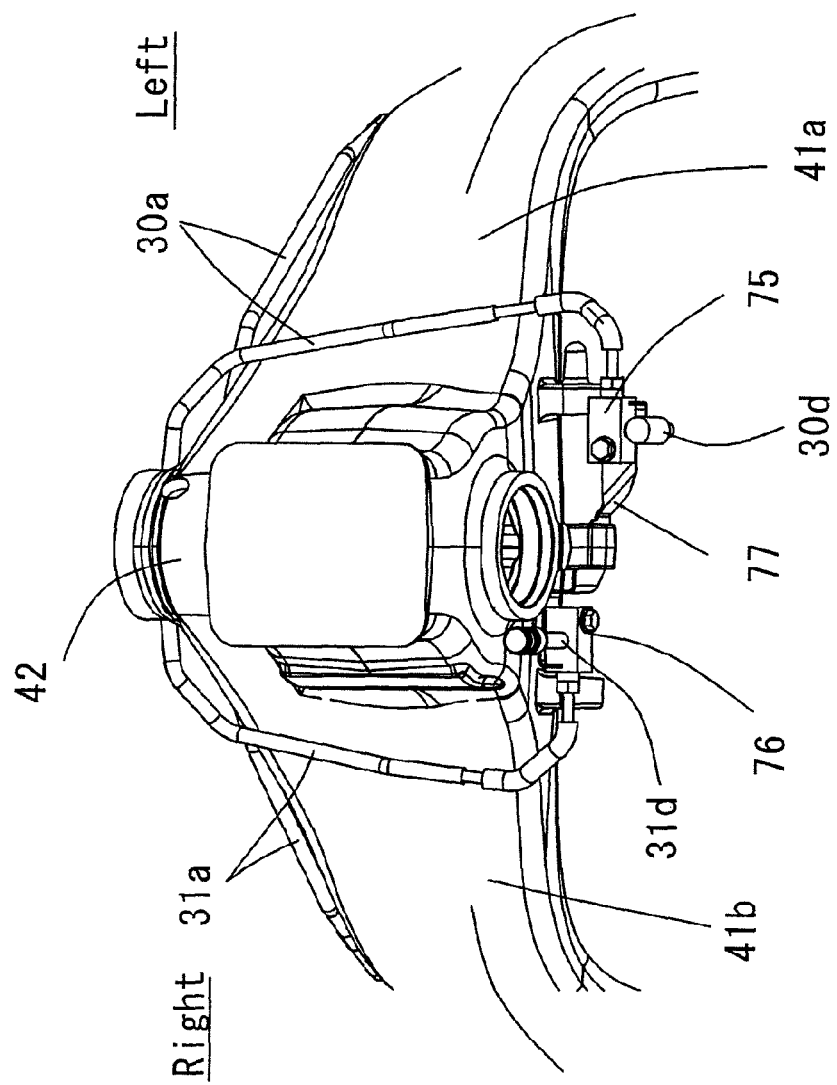
FIG. 8 is a front view of the head pipe of the main frame of FIG. 1.

FIG. 8 is a front view of the head pipe 42. The front ends of the first brake fluid pipes 30a for the front wheel caliper and the first brake fluid pipe 31a for the brake lever extend downward along the right and left side surfaces of the head pipe 42, respectively, and are fixed to a shared lower side attaching bracket 77 via joint blocks 75 and 76, respectively. The lower side attaching bracket 77 is fixed to the lower surface of the head pipe 42. The left half of the lower side attaching bracket 77 is formed in a substantially vertical shape, and the left joint block 75 is fixed to the front surface of the vertical shape portion. The right half of the lower side attaching bracket 77 is formed in a substantially horizontal shape, and the right joint block 76 is fixed to the lower surface of the horizontal shape portion.

Figure 9:
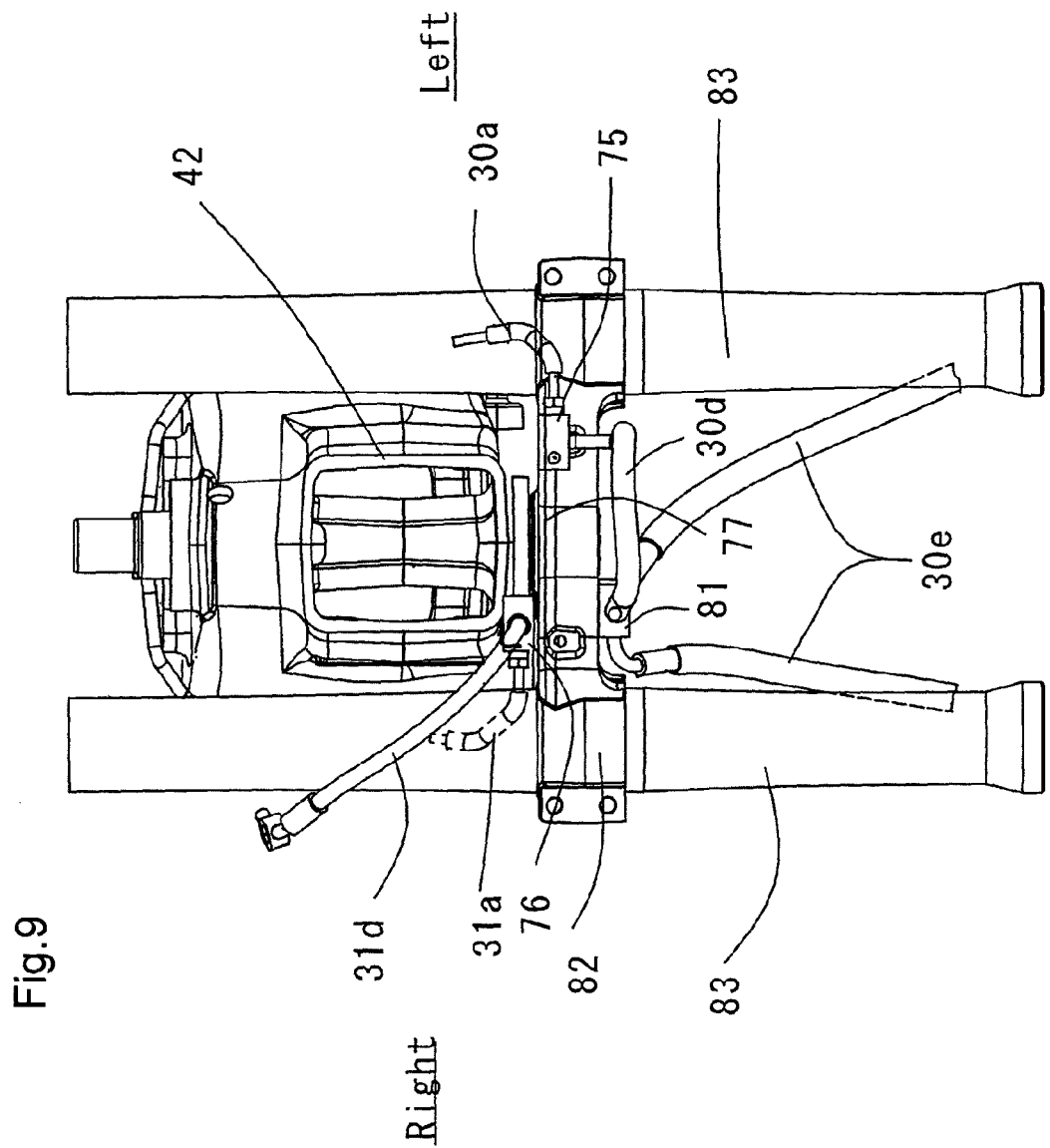
FIG. 9 is a front view showing a manageability state of brake fluid pipes around the head pipe of the main frame of FIG. 1.
Figure 10:
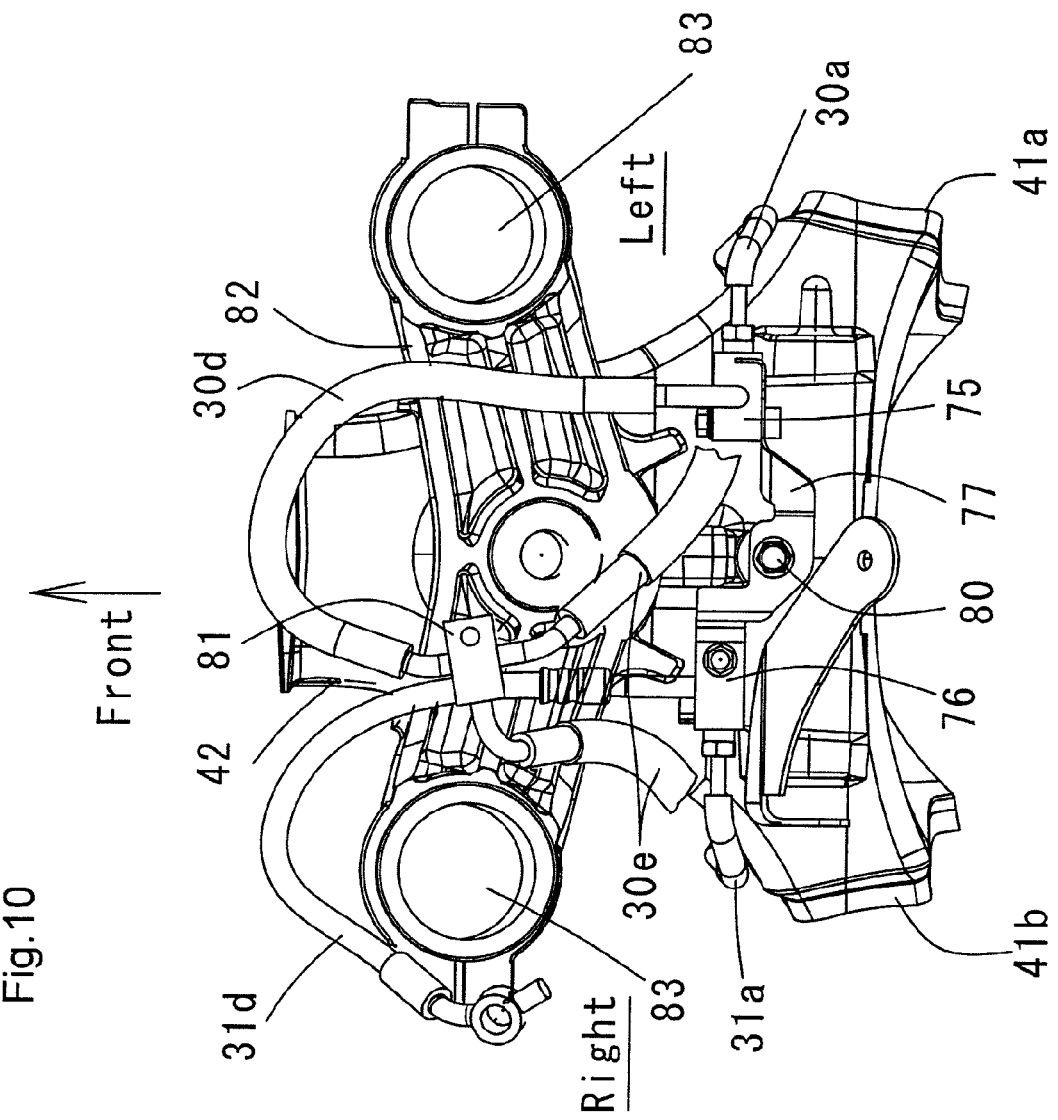
FIG. 10 is an enlarged bottom view showing the manageability state of the brake fluid pipes on the lower side of the head pipe of the main frame of FIG. 1.

FIG. 9 is a front view showing the manageability state of the brake fluid pipes around the head pipe, and FIG. 10 is an enlarged bottom view showing the manageability state of the brake fluid pipes on the lower side of the head pipe. In FIG. 10, the center portion of the width in the right and left direction of the lower side attaching bracket 77 is fixed to the lower surface of the head pipe 42 with a bolt 80.

The left joint block 75 connected to the first brake fluid pipe 30a for the front wheel caliper is connected to a fourth brake fluid pipe 30d made of rubber and extending forward. The fourth brake fluid pipe 30d extends forward, is curved rearward by a large curvature radius, and is connected to a branching joint block 81. The branching joint block 81 is fixed to a lower surface of an under bracket 82 coupling right and left front forks 83. The branching joint block 81 is connected to a pair of fifth brake fluid pipes 30e and 30e for the front wheel caliper on the right and left sides, which are made of rubber. The fifth brake fluid pipes 30e and 30e extend downward along the right and left front forks 83, as shown in FIG. 9, and are connected to the calipers 7a and 7a for braking the front wheel (FIG. 3).

In FIG. 9, the right joint block 76 connected to the first brake fluid pipe 31a for the brake lever is connected to the fourth brake fluid pipe 31d on the front wheel operation side, which is made of rubber, and the fourth brake fluid pipe 31d extends forward and upward, is curved rearward by a large curvature radius, is held by the right front fork 83, further extends to the right end of the steering handlebar, and is connected to the master cylinder 3 of the brake lever 1, as described in FIG. 3.

In the above configuration, when the air cleaner box 13 is fitted between the left frame member 41a and the right frame member 41b, as shown in FIG. 1, the brake fluid pipe assemblies 30 and 31 for the front wheel, which are fitted to the main frame 41, can easily extend in the right and left direction. First, the first brake fluid pipe 30a on the left side and the first brake fluid pipe 31a on the right side, which are made of metal, are taken out from the front clamps 51a and 51b. Along with this, the middle portions of the first brake fluid pipe 30a on the left side and the first brake fluid pipe 31a on the right side are pulled out from the left middle clamp 54 and the right middle clamp 52.

In this manner, the left brake fluid pipe assembly 30 and the right brake fluid pipe assembly 31 can easily extend to the outside of the left frame member 41a and the right frame member 41b since the second brake fluid pipes 30b and 31b at the rear ends are made of rubber, so that the air cleaner box 13 can be easily detached.

(Effects of the Embodiment of the Invention)

(1) The brake fluid pipes 30a and 31a are arranged along the upper surfaces of the left frame member 41a and the right frame member 41b, so that they can be arranged compactly, and can largely secure the space between the left frame member 41a and the right frame member 41b, whereby the shape and volume of the air cleaner box 13 arranged between the left frame member 41a and the right frame member 41b can be large, and the detaching of the air cleaner box 13 can be easy.

(2) The first brake fluid pipe 31a for the brake lever and the first brake fluid pipe 30a for the front wheel caliper for braking the front wheel are arranged on the upper surfaces of the frame members 41a and 41b, so that the piping length of the brake fluid pipe assemblies 30 and 31 can be shortened, and the layout of the pipes 31a, 30a can be simplified. In particular, the first brake fluid pipe 30a for the front wheel caliper and the first brake fluid pipe 31a for the brake lever are distributively arranged on the left frame member 41a and the right frame member 41b, so that the small clearance between the upper surfaces of the frame members 41a and 41b and the air cleaner box 13 can be used effectively, respectively.

(3) The second brake fluid pipes 30b and 31b at the rear ends of the brake fluid pipe assemblies 30 and 31 are made of rubber having flexibility, and most of the remaining portions are made of metal. Therefore, when the air cleaner box 13 is detached, by using the flexing of the second brake fluid pipes 30b and 31b made of rubber as described above, the brake fluid pipes 30a and 31a can extend outward in the right and left direction, and the air cleaner box 13 can be easily detached. In particular, since the second brake fluid pipes 30b and 31b made of rubber extend downward from the upper surfaces of the frame members 41a and 41b, the lower portions of the second brake fluid pipes 30b and 31b made of rubber are bent, so that the first brake fluid pipes 30a and 31a made of metal can be easily displaced or shifted outward in the right and left directions.

(4) The clamps 51a, 51b, 52, and 54 for fixing the brake fluid pipes 30a and 31a are provided in the upper portions of the frame members 41a and 41b, so that the air cleaner arranging space between the left frame member 41a and the right frame member 41b can be secured more largely.

(5) The ABS unit 10 arranged in the rear portion of the main frame 41 is displaced to one of the right and left sides, e.g., in the left side, and the front wheel caliper brake fluid pipe assembly 30 is arranged on the frame member 41a on the same side (left side) of the right and left sides, so that the piping length of the front wheel caliper brake fluid pipe assembly 30 can be shortened to shorten a brake piping path.

(6) The first brake fluid pipe 30a on the left side and the first brake fluid pipe 31b on the right side, which are disposed on the upper surfaces of the left frame member 41a and the right frame member 41b, are located outward in the right and left direction from the right and left side walls of the air cleaner box 13 portion projected upward from the upper surfaces of the left frame member 41a and the right frame member 41b, whereby the easiness of the detaching of the air cleaner box 13 can be secured.

(7) In FIG. 1, the second brake fluid pipe 31b arranged at the rear end of the right brake fluid pipe assembly 31 is curved downward along the inner side surface of the right frame member 41b in the region rearward of the rear end of the air cleaner box 13, so that the interference of the air cleaner box 13 with the brake fluid pipe 31b can be prevented.

(8) In the motorcycle, typically, a clutch and a generator are arranged on the right side of the engine 15. In this embodiment, the ABS unit 10 is arranged on the left side opposite to the arranging side of the clutch or the like, so that the weight balance can be set toward the center, and the arranging space of various equipment can be secured.

(9) As shown in FIG. 6, the brake fluid pipe 30a is arranged in the space surrounded by the upper surface of the frame member 41a, the air cleaner box 13, and the decorative cover 67, thereby improving the appearance of the vehicle.

(10) In FIG. 1, the brake fluid pipe 30a for the front wheel caliper extending from the ABS unit 10 arranged on the left side to the front wheel calipers 7a is arranged on the upper surface of the left frame member 41a, so that the piping length from the ABS unit 10 to the front wheel calipers 7a can be shortened.

(11) In FIG. 7, the left front clamp 51a and the right front clamp 51b, which hold the first brake fluid pipe 30a on the left side and the first brake fluid pipe 31a on the right side, are integrally molded with resin on the upper surface of the head pipe 42, so that the number of clamp members and the number of attaching steps with them can be reduced.

(12) In FIG. 8, the front ends of the first brake fluid pipe 30a on the left side and the first brake fluid pipe 31a on the right side extend downward along the right and left side surfaces of the head pipe 42, so that the front ends of the first brake fluid pipes 30a and 31a can be covered with, e.g., a front cowl, thereby improving the appearance.

(13) In FIG. 10, the lower ends of the first brake fluid pipe 30a on the left side and the first brake fluid pipe 31a on the right side, which extend downward along the right and left sides of the head pipe 42, are attached to the head pipe 42 via the shared attaching bracket 70. In this point as well, the number of members for fixing the brake fluid pipes can be reduced.

(14) The portions formed on the inclination surfaces which become lower from the outer edges in the vehicle width direction toward the inside in the vehicle width direction are present on the upper surfaces of the left frame member 41a and the right frame member 41b. At least the portions of the brake fluid pipes 30a and 31a adjacent sideward of the air cleaner 13 are disposed inward from the outer edges in the vehicle width direction and outward from the inner edges in the vehicle width direction, on the upper surfaces of the frame members 41a and 41b. Thereby, when the air cleaner 13 is detached from the main frame 41, the interference of the air cleaner 13 with the brake apparatus can be prevented.

(15) With regard to the froe-aft direction, the brake fluid pipe is fixed at the flexible portion side thereof, e.g., the rear side of the brake fluid pipe, so that displacement or shift and vibration near the flexible portion of the brake fluid pipe can be prevented.

(16) The brake fluid pipe passes through the space formed between the frame member, the air cleaner, and the fuel tank cover. Thereby, the volume of the air cleaner or the fuel tank can be larger than that of the configuration in which the brake fluid pipe passes above the air cleaner.

(17) The ABS unit 10 is arranged on the opposite side of the arranging side of the clutch or the generator, so that the weight balance can be set toward the center and the arranging space can be secured. In addition, the pipes extending from the ABS unit are arranged on the ABS unit side (left side), so that the piping length can be shortened.

Other Embodiments of the Invention (1) The first brake fluid pipe 30a of the front wheel caliper brake fluid pipe assembly 30 and the first brake fluid pipe 31a of the brake lever brake fluid pipe assembly 31 can also be arranged on one of the left frame member 41a and the right frame member 41b. With this configuration, the number of clamp members can be reduced, and the attaching operation with the clamps can be easy. For example, when the ABS unit is arranged on the right side, the first brake fluid pipes 30a and 31a may be arranged on the right side.

(2) Although in the first embodiment, the air cleaner box 13 is used between the left frame member 41a and the right frame member 41b, the fuel tank can also be arranged as other equipment.

(3) Needless to say, the present invention is applicable to a motorcycle in which the ABS unit is arranged in the position displaced or shifted to the right side. Regardless of whether or not the hydraulic control unit such as the ABS unit is mounted and its arrangement, the present invention is also applicable to the brake apparatus in which the brake pipe is passed forward and rearward of the frame.

(4) The present invention is not limited to the configuration of the above-described embodiments, and various modifications contemplated in the scope without departing from the contents described in claims are included.

What is claimed is:

1. A hydraulic brake apparatus of a motorcycle including a main frame having a pair of right and left frame members extending rearward from a head pipe and equipment including at least one of an air cleaner box and a fuel tank arranged in a space between the right and left frame members as seen in plan view, the hydraulic brake apparatus comprising:
    at least one brake fluid pipe located directly on an upper surface of one of the frame members, the at least one brake fluid pipe extending rearward from near the head pipe along the upper surface of the one frame member; and
    a decorative cover fixed to the one frame member, the decorative cover covering the one frame member and the equipment from outside of the main frame,
    wherein a part of the at least one brake fluid pipe extending along the upper surface of the one frame member passes through a space defined by an inside wall of the decorative cover in the vehicle width direction and an outside wall of the equipment in the vehicle width direction.

2. The hydraulic brake apparatus of a motorcycle according to claim 1, wherein the at least one brake fluid pipe extending rearward from near the head pipe includes a brake lever brake fluid pipe connected to a master cylinder of a brake lever on a steering handlebar, and a caliper brake fluid pipe connected to a caliper of a hydraulic braking portion provided on a front wheel.

3. The hydraulic brake apparatus of a motorcycle according to claim 2, wherein the brake lever brake fluid pipe and the caliper brake fluid pipe are arranged on the right and left frame members, respectively.

4. The hydraulic brake apparatus of a motorcycle according to claim 2, further comprising:
    a hydraulic control unit displaced to one of the right and left sides relative to a center of the motorcycle, wherein the front wheel caliper brake fluid pipe is arranged on the same side as the hydraulic control unit.

5. The hydraulic brake apparatus of a motorcycle according to claim 2, wherein both the brake lever brake fluid pipe and the caliper brake fluid pipe are arranged together on one of the right and left frame members.

6. The hydraulic brake apparatus of a motorcycle according to claim 1, wherein in the brake fluid pipe one end portion in a fore-aft direction is formed of a member having flexibility, and a remaining portion is formed of a member having higher rigidity than the one end portion.

7. The hydraulic brake apparatus of a motorcycle according to claim 1, wherein the upper surface of the frame member is provided with a clamp member fixing the brake fluid pipe.

8. A motorcycle comprising:
    right and left frame members extending rearward from a head pipe;

equipment arranged in a space between the right and left frame members as seen from above the motorcycle, the equipment being positioned above the level of the frame members as seen from a side of the motorcycle; and right and left decorative covers covering the right and left frame members, respectively, and the equipment from outside of the main frame; and a hydraulic brake apparatus including right and left brake fluid pipes located on an upper surface of at least one of the right and left frame members, the brake fluid pipes extending rearward from near the head pipe along the upper surfaces of the right and left frame members, and the brake fluid pipes being located outside of the equipment in a width direction of the motorcycle, wherein the decorative covers and the equipment are fixed to the fight and left frame members, and each of the right and left brake fluid pipes extends in a space defined by a side wall of the equipment, an upper surface of the respective frame member, and an inner surface of the respective decorative cover.

* * * * *